(12) United States Patent
Zakharov

(10) Patent No.: US 10,795,301 B1
(45) Date of Patent: Oct. 6, 2020

(54) MONITOR AN IMAGE QUALITY BY COMPARING A TONER COVERAGE WITH TWO GRAPHIC PATTERNS

(71) Applicant: KYOCERA Document Solutions, Inc., Osaka (JP)

(72) Inventor: Oleg Y. Zakharov, Walnut Creek, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/693,154

(22) Filed: Nov. 22, 2019

(51) Int. Cl.
*G03G 15/00* (2006.01)
*B41J 29/393* (2006.01)
*G06F 3/12* (2006.01)

(52) U.S. Cl.
CPC ..... *G03G 15/5062* (2013.01); *G03G 15/5058* (2013.01); *G03G 15/5079* (2013.01); *G03G 15/556* (2013.01); *B41J 29/393* (2013.01); *B41J 2029/3935* (2013.01); *G03G 2215/00037* (2013.01); *G06F 3/1285* (2013.01)

(58) Field of Classification Search
CPC .......... G03G 15/5079; G03G 15/5058; G03G 15/5062; G03G 15/556; G03G 2215/00037; G06F 3/1285; B41J 29/393; B41J 2029/3935
See application file for complete search history.

(56) References Cited

U.S. PATENT DOCUMENTS

| 8,760,716 | B2 | 6/2014 | Yamada |
| 10,108,103 | B2 | 10/2018 | Nishimura et al. |
| 2018/0086049 | A1* | 3/2018 | Ueshima ................ B41J 2/2142 |
| 2018/0154654 | A1* | 6/2018 | Sender Beleta ..... B41J 2/16579 |
| 2019/0045068 | A1* | 2/2019 | Tanaka ............... G03G 15/5062 |

* cited by examiner

*Primary Examiner* — Joseph S Wong
(74) *Attorney, Agent, or Firm* — Rowan TELS LLC

(57) ABSTRACT

This disclosure relates to a method, apparatus, and system for determining image quality of a printer or similar image forming device. A first graphic pattern and a second graphic pattern may be printed on sets of N≥1 test pages. The second graphic pattern may have the same colorant coverage as the first graphic pattern, though the two patterns may have different orientations and different locations on the page. The patterns may partially overlap in page location. Total colorant coverage may be compared between the set of N first test pages and the set of N second test pages. If the colorant coverage is different between the sets, the image forming device may be assigned an abnormal operating status.

20 Claims, 12 Drawing Sheets

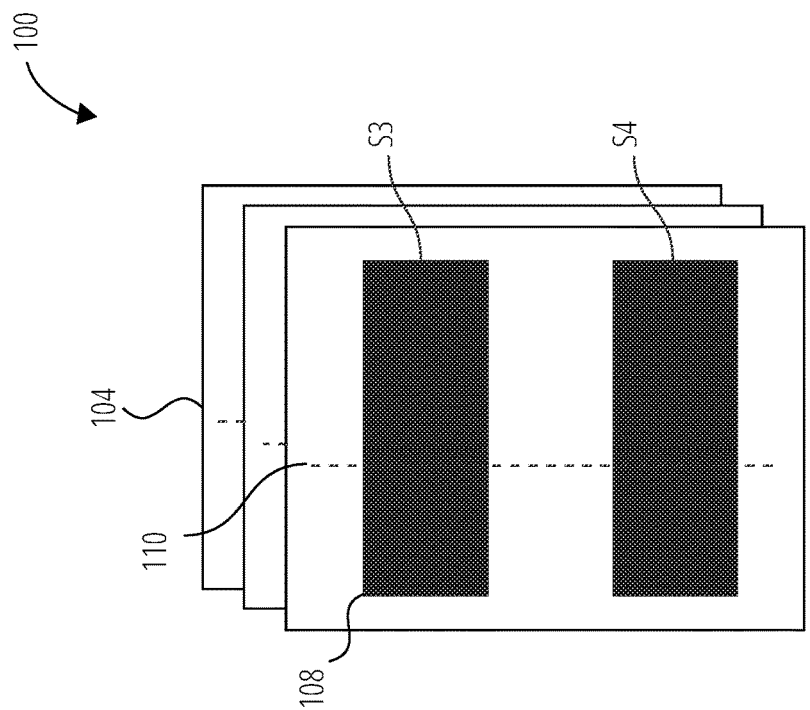
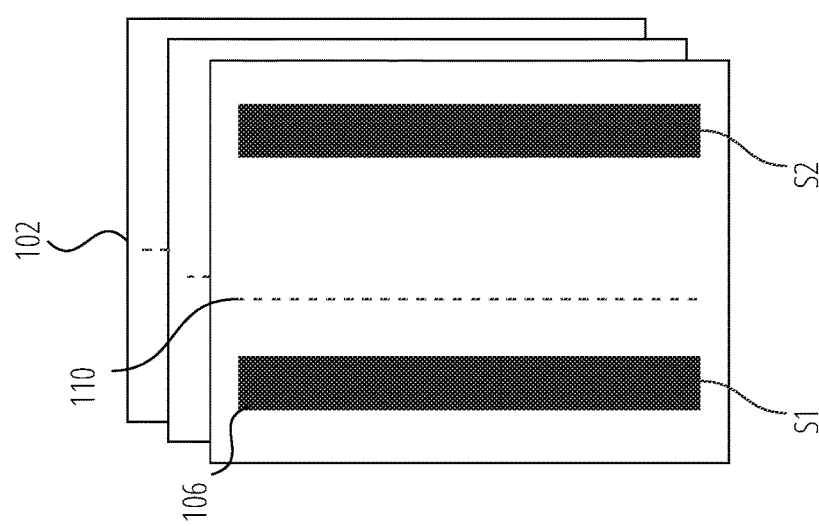
FIG. 1

MONITOR AN IMAGE QUALITY BY COMPARING A TONER COVERAGE WITH TWO GRAPHIC PATTERNS

BACKGROUND

Monitoring image quality produced by printing devices is a common problem in the printing industry. A defect on a print image may be symptomatic of a number of problems with a printing device, each requiring different maintenance work. As part of a technical support ticket, a user may even need to take a picture of a defective print image and send it to a customer support service.

In some cases, maintenance may be performed by an end user, but it is often necessary to call in a trained technician to replace parts, clean, or otherwise repair a malfunctioning machine. However, such a technician may work most efficiently when a problem is diagnosed in advance, and the technician is prepared with the replacement parts and other repair equipment upon arrival. This diagnosis and preparation would in turn benefit from being based on information that is more easily quantified and obtained directly from the printing device, rather than potentially low-quality photographs of a poor printout.

There is a need, therefore, for a methodology to produce measurable results indicative of certain image flaws having specific causes, such that certain failure modes may be diagnosed remotely, based only on printer data available locally or over a network.

BRIEF SUMMARY

This disclosure relates to a method of determining an image quality of an image forming device. A first graphic pattern may be printed on N≥1 first test pages. Next, a second graphic pattern may be printed on the same number N of second test pages. The second graphic pattern may have the same colorant coverage as the first graphic pattern. The first graphic pattern may have a different orientation and a different location on the first test page compared to the second graphic pattern on the second test page. The location of the second graphic pattern on the second test page may partially overlap the corresponding location of the first graphic pattern on the first test page. The colorant coverage may be compared, then, between the total number of first test pages and the total number of second test pages. Finally, if the colorant coverage is different from the set of first test pages to the set of second test pages, the image forming device may be assigned an abnormal operating status.

This disclosure further relates to an image forming device. The image forming device may comprise a processor and a memory. The memory may store instructions that, when executed, implement the method described above.

Finally, this disclosure relates to an image forming system. The image forming system may comprise at least one image forming device connected to a network. The image forming system may further comprise a server, such as an image forming server, connected to the at least one image forming device via the network. The image forming server may comprise a processor and a memory. The memory of the image forming server may store instructions that, when executed, implement the method described above.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates test pages to determine image quality 100 in accordance with one embodiment.

DETAILED DESCRIPTION

Figure 2:
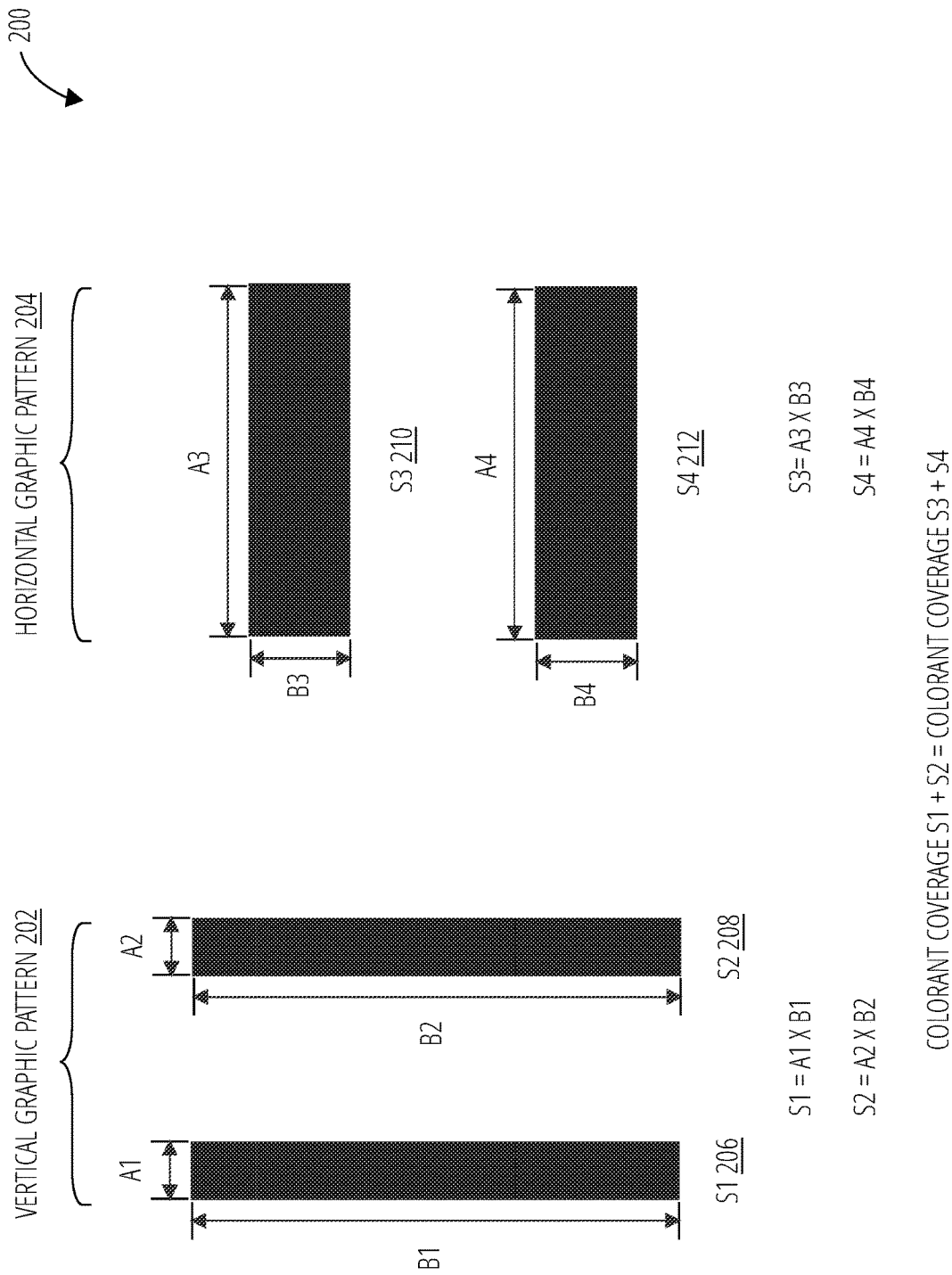
FIG. 2 illustrates graphic pattern elements 200 in accordance with one embodiment.

The method, apparatus, and system disclosed address a defect comprising, for example, an unexpected vertical line that appears on an image not containing the line when produced by an image forming device, such as a printer. In an illustrative example, a black vertical line may appear across printed text on a page generated by a printer with a certain type of problem. The disclosed method involves printing test pages with a specific graphic pattern designed to reveal this flaw through printer sensor data, such as the amount of colorant available to the printing system before and after a set of test pages is printed. "Graphic pattern" refers to the shape and pattern of an area on a test page printed by an image forming device. Examples may include rectangles, squares, or any other shape. "Test page" refers to a medium, such as paper, upon which the image forming device forms an image using a colorant.

To accomplish this, each graphic pattern for use in printing a test page has a different orientation and location on the test page, but the geometric areas covered by colorant (i.e., the colorant coverage) are equal. "Geometric area" refers to the area of a printed graphic pattern of a test page. "Colorant" refers to any ink, dye, or toner used by the image forming device for form an image on a medium, such as paper. "Colorant coverage" refers to the area of the test page covered with colorant. The two graphic patterns may also have areas of overlap with regard to their geographic location on their respective test pages.

Because the amount of colorant used intentionally in printing the different graphic patterns is equal, a difference in the amount of colorant consumed by two print jobs, each comprising multiple printings of test pages displaying one of the graphic patterns, may indicate the existence of, for example, an unexpected vertical line print defect. Because this type of defect may require a replacement print drum or expert cleaning of the print drum to correct, it may be beneficial to diagnose the defect remotely, by initiating test page print jobs, before a service technician is sent to make the repairs.

In some embodiments, a test for the unexpected vertical line may run automatically, and a difference in detected colorant consumption may result in the printer being assigned an abnormal operating status, and being flagged for maintenance and repair. "Abnormal operating status" refers to a status where the operation of the image forming device has changed for how the device normally operates. An abnormal operating status may include hardware issues, such as paper jams, equipment cleanliness, and equipment component wear or failure. An abnormal operating status may result in a change in image quality.

In some embodiments, the test may be initiated by users local to the image forming device or remote users, such as customer service support personnel, upon receiving a call or ticket indicating printer issues. "User" refers to any person or device accessing the image forming device, including, computing devices, and servers. "Remote user" refers to a user that is not physically at the image forming device itself. The user may interact with the image forming device through any non-physical means, such as a network including ethernet, WiFi, Bluetooth, short range wireless, near field communication, ANT, infrared, etc., but is not limited thereto.

FIG. 1 illustrates test pages to determine image quality 100 in accordance with one embodiment. The test pages to determine image quality 100 comprise a set of first test pages 102 and a set of second test pages 104.

The first test pages 102 may be printed with a first graphic pattern 106, comprising elements S1 and S2. The second test pages 104 may be printed with a second graphic pattern 108, comprising elements S3 and S4. These elements are described in additional detail with regard to FIG. 2.

As illustrated, an image forming device or printer experiencing a certain type of problem may exhibit the presence of, for example, an unexpected vertical line 110 across every test page printed.

FIG. 2 illustrates graphic pattern elements 200 in accordance with one embodiment. The graphic pattern elements 200 comprise a vertical graphic pattern 202 and a horizontal graphic pattern 204. The vertical graphic pattern 202 comprises elements of area S1 206 and area S2 208. The horizontal graphic pattern 204 comprises elements of area S3 210 and area S4 212. Area S1 206 has dimensions A1×B1 as illustrated. Area S2 208 is A2×B2, area S3 210 is A3×B3, and area S4 212 is A4×B4.

The dimensions A1, B1, A2, B2, etc. may be selected such that the following equation is satisfied.

$$A1 \times B1 + A2 \times B2 = A3 \times B3 + A4 \times B4 \quad \text{Equation 1}$$

In this way, colorant coverage for S1+S2 may equal colorant coverage for S3+S4. Thus, the two graphic patterns may be expected to consume the same amount of colorant when printed on a fully functional printer.

In embodiments such as the one illustrated, area S1 206 and area S2 208 may also be equal, and area S3 210 may equal area S4 212. Area S1 206 may additionally be equal to area S3 210, and area S2 208 may equal area S4 212. However, in some embodiments these equalities may not exist. Variations in proportions of each element may be optimized to more specifically indicate the failure conditions of the image forming device. However, the colorant coverage may be equal between the two graphic patterns in order to detect the issue as disclosed herein.

Figure 3:
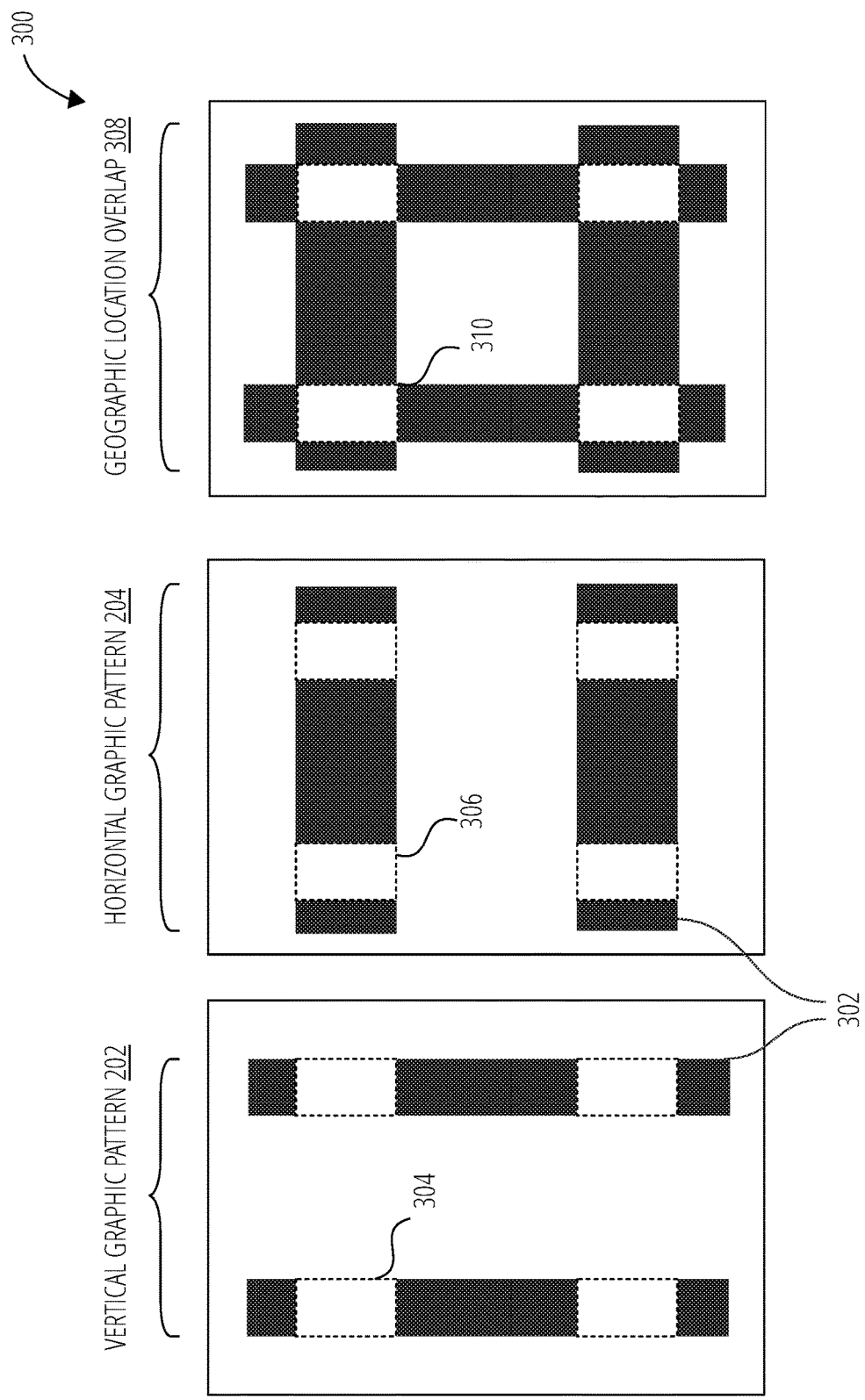
FIG. 3 illustrates graphic pattern elements 300 in accordance with one embodiment.

FIG. 3 illustrates graphic pattern elements 300 in accordance with one embodiment. In some embodiments, different location and different orientation 302 between the vertical graphic pattern 202 and horizontal graphic pattern 204 may result in areas of overlap with regard to the geographic location of each pattern on their respective test pages.

That is, a location of partial overlap 306 on the test page printed with the horizontal graphic pattern 204 may align with the corresponding location of partial overlap 304 on the test page printed with the vertical graphic pattern 202, should the two test pages be laid one on top of the other. This overlap 310 is illustrated under geographic location overlap 308.

Figure 4:
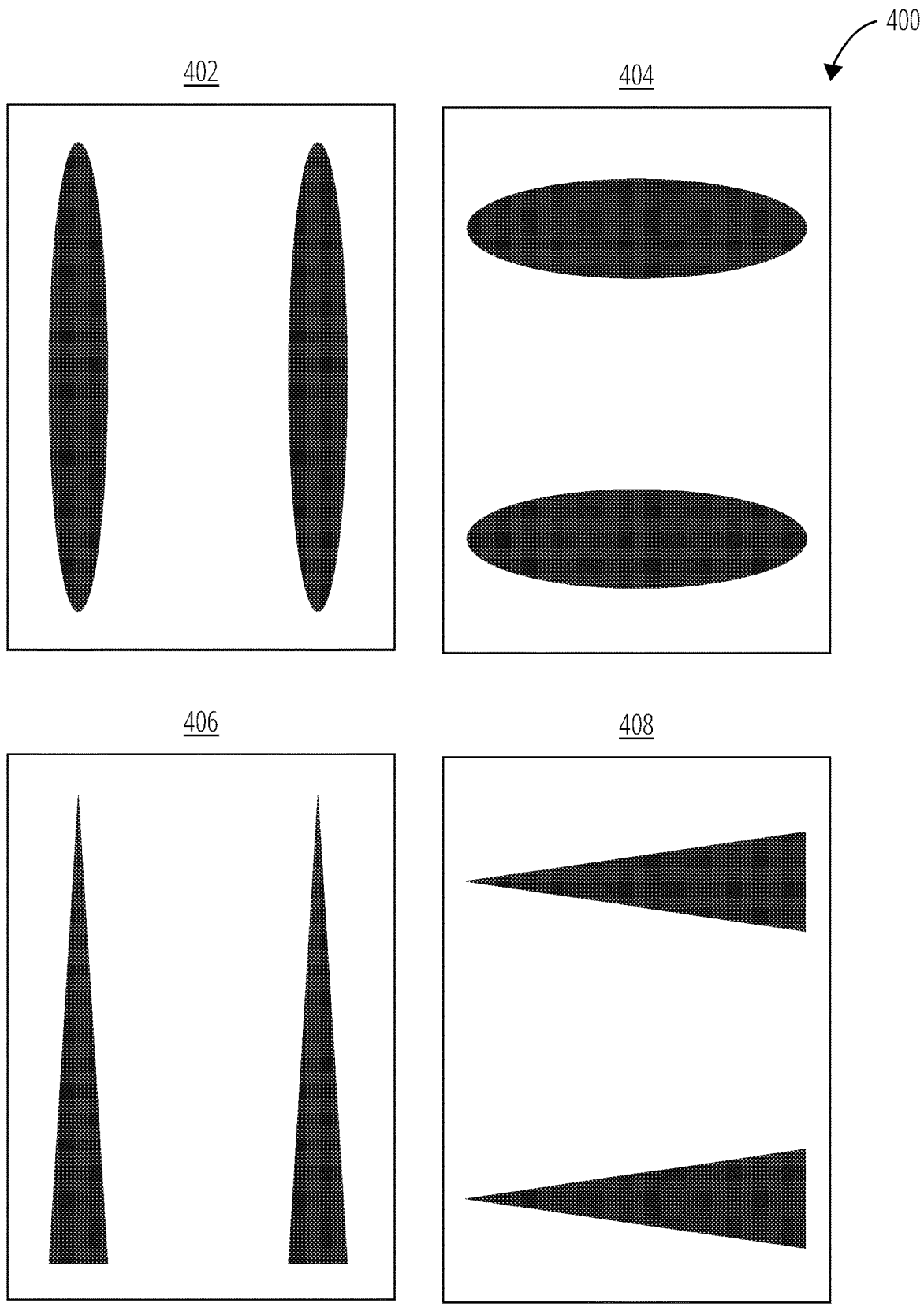
FIG. 4 illustrates alternative graphic patterns 400 in accordance with one embodiment.

FIG. 4 illustrates alternative graphic patterns 400 in accordance with some embodiments. Rather than the rectangular elements illustrated in previous figures, some implementations of the disclosed method, apparatus, and system, may utilize a vertical ellipsoid graphic pattern 402 on first test pages and a horizontal ellipsoid graphic pattern 404 on second test pages. Other embodiments may use a vertical triangular graphic pattern 406 and a horizontal triangular graphic pattern 408 on the first test pages and second test pages.

Other combinations are also possible. Vertical graphic patterns may be printed on second test pages and horizontal graphic patterns on first test pages. First test pages may use rectangular elements while second test pages use triangular elements. Size, shape, and area may be selected to diagnose the circumstances of the failure causing an image quality defect more specifically, or may differ for different types of image quality issues, such as vertical lines, black spots, low image density, etc., provided the amount of ink, toner, or other colorant of any color may be expected to be the same for the two test page sets when generated by a fully functional image forming device.

Figure 5:
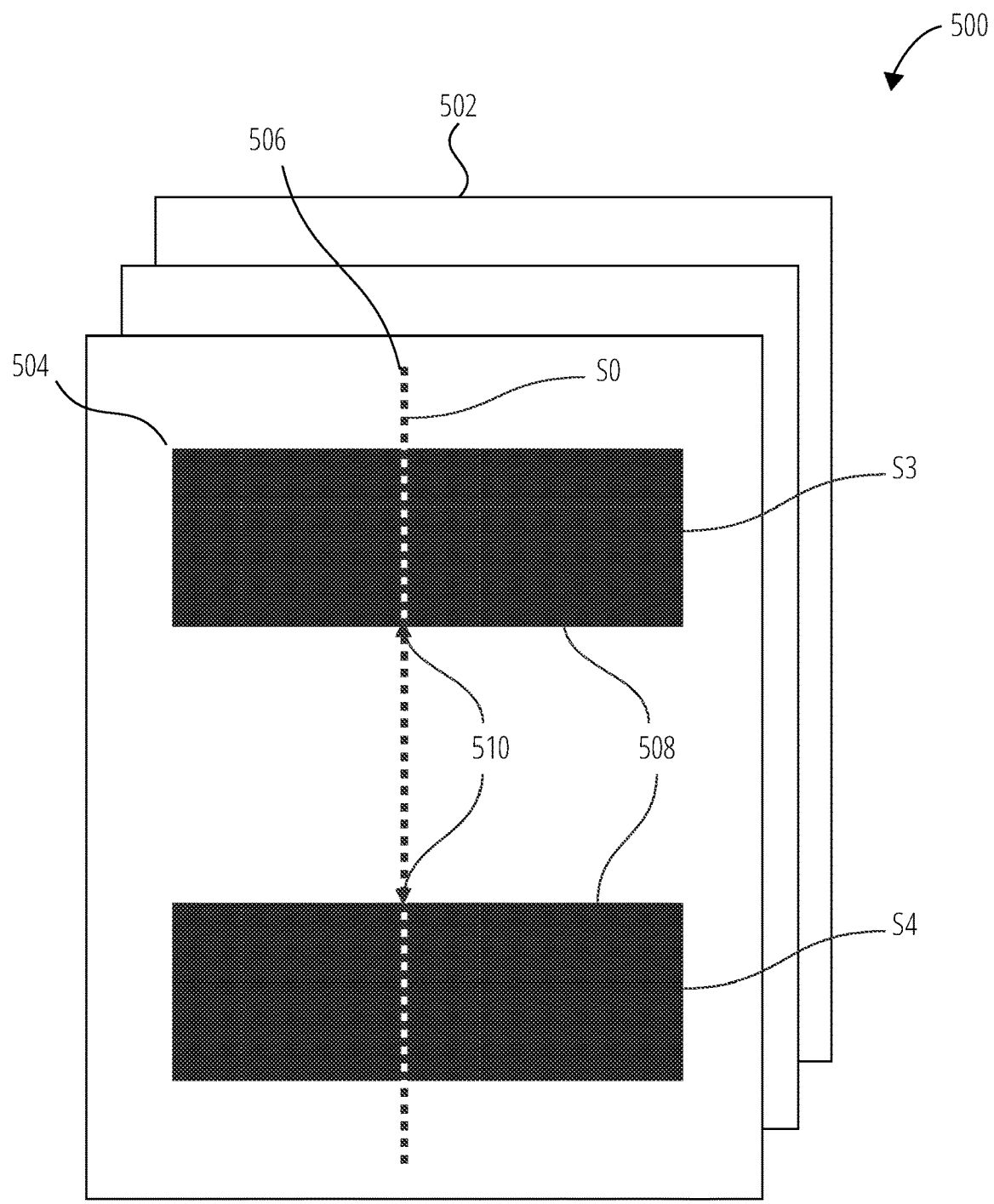
FIG. 5 illustrates horizontal graphic pattern details 500 in accordance with one embodiment.

FIG. 5 illustrates horizontal graphic pattern details 500 in accordance with one embodiment. The test pages 502 may be printed with a horizontal graphic pattern 504 as shown. If the printer has an image quality issue in the form of an unexpected vertical line, each printed page will have this unexpected vertical line 506 defect, regardless of the graphic pattern printed.

The colorant coverage incurred by the unexpected vertical line 506 may have an unknown size S0 that is greater than zero. Thus for each page, some unexpected amount of colorant may be expended as the unexpected vertical line 506 is deposited on the page.

In the case illustrated previously in FIG. 2, with the unexpected vertical line falling between the elements of the vertical graphic pattern, the full extent of the line may receive an amount of colorant above and beyond the coverage incurred by the vertical graphic pattern. This vertical coverage may be expressed by the equation below.

$$\text{Vertical Coverage} = S1 + S2 \pm S0 \quad \text{Equation 2}$$

For the same unexpected vertical line 506, the area covered by horizontal graphic pattern 508 may be designed to be equal to the area covered by the vertical graphic pattern (i.e., S1+S2=S3+S4, as explained previously). However, some portion of the colorant incurred by the unexpected vertical line 506 is alternatively accounted for by the area covered by horizontal graphic pattern 508. This is indicated as an area of unexpected vertical line covered by horizontal graphic pattern 510 in this figure.

In the case where two test pages are printed with different graphic patterns, there may thus be a small difference in coverage, as some percentage of S0 will not be incurred when printing the horizontal graphic pattern. In a case where, for example, the vertical width of S3 and S4 together account for 40% of the page, the horizontal coverage may be expressed as:

Horizontal Coverage=$S3+S4\pm 0.6\times S0$  Equation 3

By printing test pages and comparing toner coverage between two graphic patterns, an image quality defect in the form of a vertical line may thus be recognized. This difference in coverage may not be measurable when only one copy of each test page is printed, however. There may be a minimum measurable difference detectable by sensors within the image forming device. In this case, more test pages (but the same number of each test page) may need to be printed to reveal the difference in colorant coverage.

In the case (not illustrated) where the unexpected vertical line 506 lies completely within either S1 or S2 of the vertical graphic pattern, the vertical coverage may not contain the extra S0 amount. However, the horizontal coverage will still exhibit a difference from the vertical coverage, by virtue of some portion of S0 still being used in addition to the elements of the horizontal graphic pattern.

Figure 6:
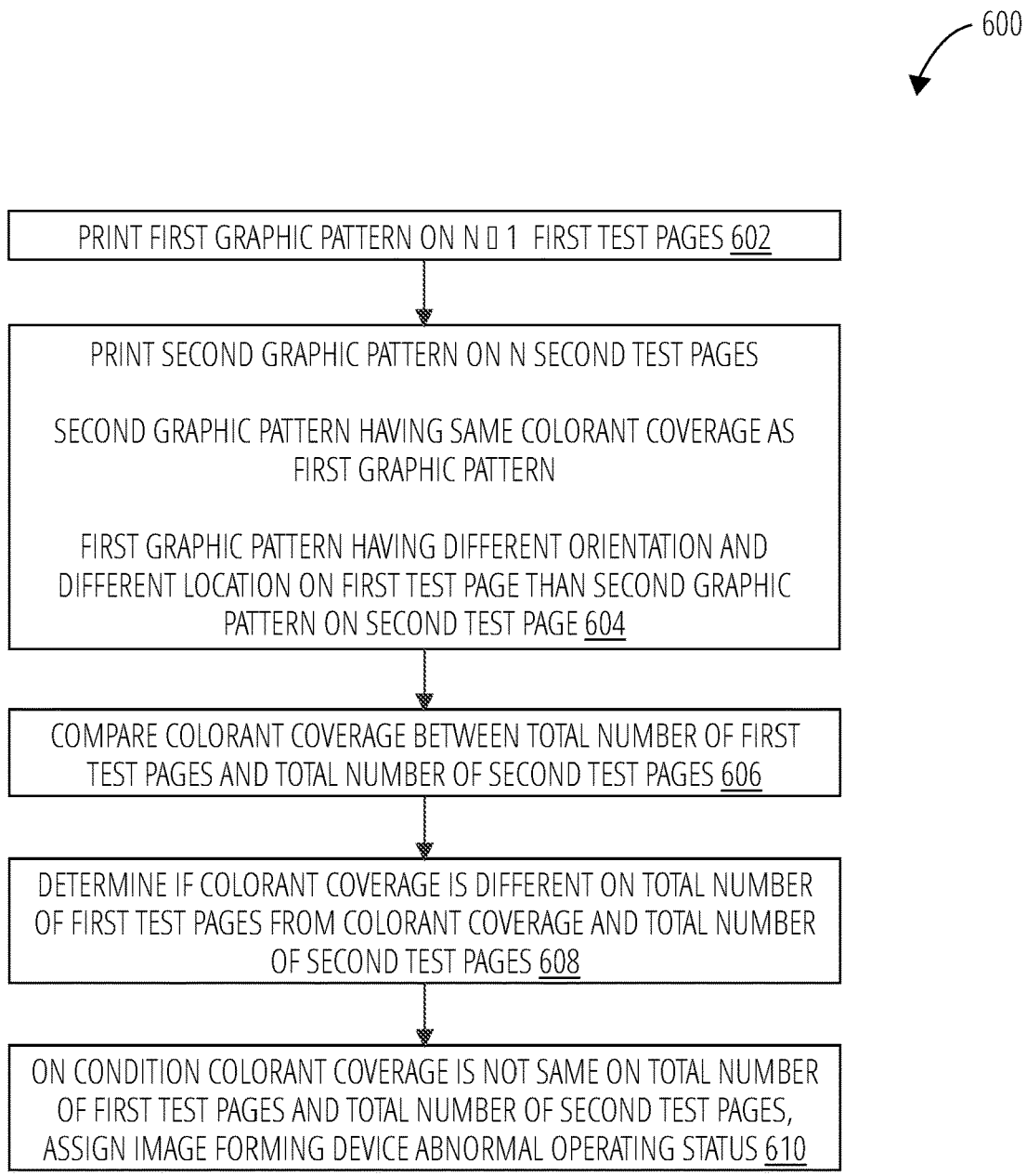
FIG. 6 illustrates a method 600 in accordance with one embodiment.

FIG. 6 illustrates a method 600 in accordance with one embodiment. The method 600 starts at step 602 by printing a first graphic pattern on N≥1 first test pages. The method 600 continues at step 604 with printing a second graphic pattern on N second test pages, the second graphic pattern having a same colorant coverage as the first graphic pattern. The method 600 may rely on the same number N of each test page being printed, so that differences between the two sets of test pages may be accurately attributed to an image quality defect, rather than the number of pages printed. In some embodiments, N≥1. Step 602 and step 604 may be performed on an image forming device. The steps below may be performed on the image forming device, a server (e.g., print server, maintenance server, image forming server, monitoring server, etc.), and combinations thereof.

Method 600 continues at step 606 with comparing colorant coverage between a total number of first test pages and a total number of second test pages. In one embodiment, this may be done by sensing a weight or mass of toner residing in a toner reservoir before and after each test page print job. Differences between toner, ink, or colorant amounts used, determined at step 608, may be indicated by measurements before and after printing the first test page set and measurements before and after the second test page set may be made more easily measurable by increasing the N copies printed per set.

In step 610, on condition that the colorant coverage is not the same on the total number of first test pages and the total number of second test pages, method 600 assigns the image forming device an abnormal operating status. Such a status may be used to flag a machine for maintenance. In some embodiments, a message may be sent from the image forming device to an administrator or a repair technician as a result of the status change.

Figure 7:
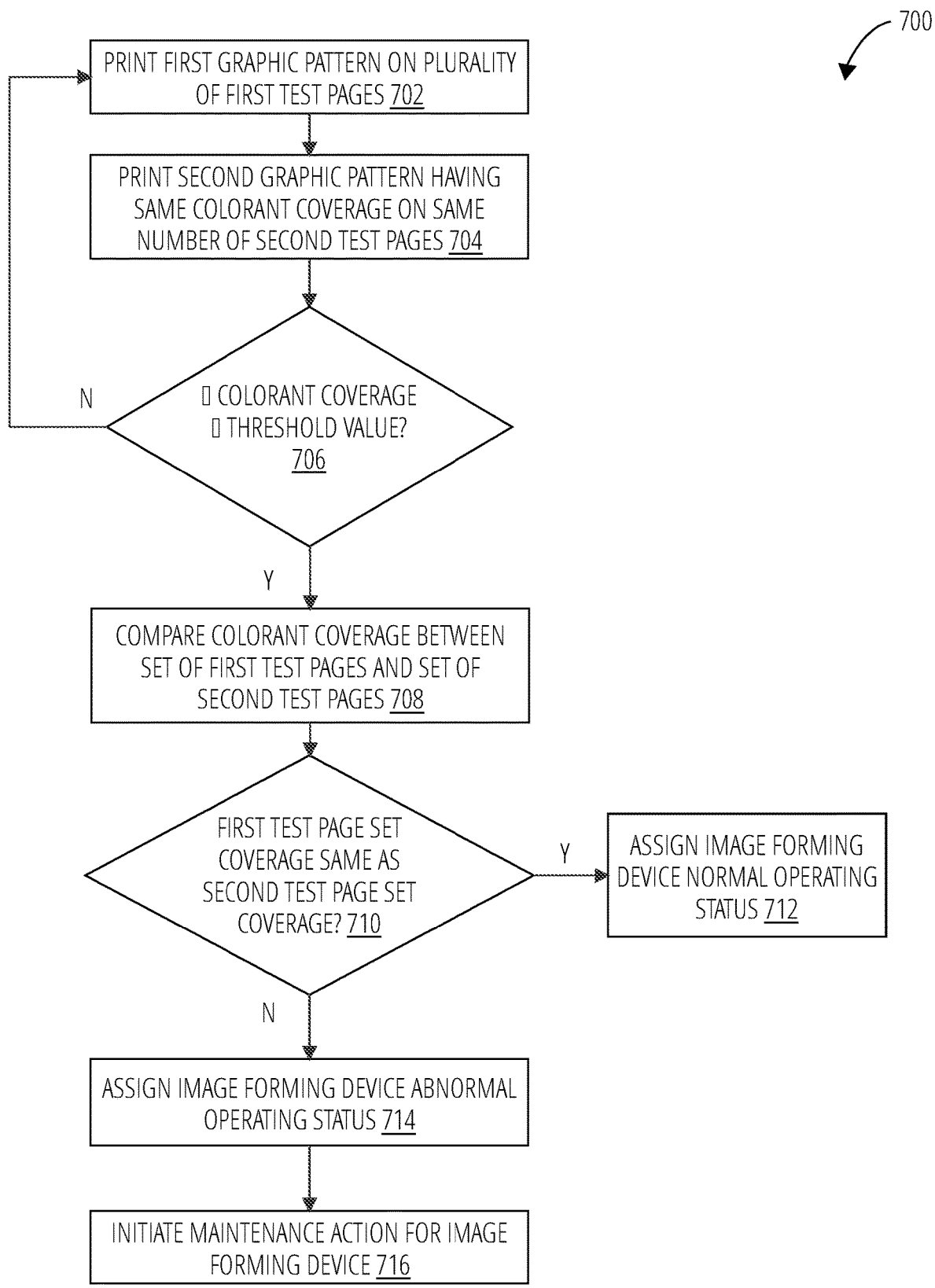
FIG. 7 illustrates a method 700 in accordance with one embodiment.

FIG. 7 illustrates a method 700 in accordance with one embodiment. The method 700 begins at step 702 with printing a first graphic pattern on a plurality of first test pages. At step 704, the same number of second test pages may be printed with a second graphic pattern having the same colorant coverage as the first graphic pattern, as described with regard to FIG. 6. The first graphic pattern may have a different orientation and different location on the first test page than the second graphic pattern on the second test page. The two graphic patterns may, however, have a partial overlap at corresponding locations of the two test pages as illustrated previously.

At decision block 706, the difference in colorant coverage incurred in printing the two sets of test pages may be compared to a threshold value. The threshold value may be determined by the sensitivity of colorant measurement possible with the image forming device performing method 700. The threshold value may be set for an amount of colorant expenditure that would be expected to reveal the difference in coverage that occurs as a result of an image quality defect. If the threshold value is not met in decision block 706, method 700 may return to step 702 to print more copies of each test page. If the threshold value has been met, method 700 may continue to step 708.

At step 708, method 700 may compare colorant coverage between a total number of first test pages and a total number of second test pages. The method 700 may then determine at step 710 whether or not the colorant coverage is different on the total number of first test pages from the colorant coverage on the total number of second test pages.

On condition that the first test page coverage and second test page coverage are determined at step 710 to be the same, method 700 may at step 712 assign the image forming device a normal operating status. An identical amount of toner used in printing both test page sets may be indicative of a fully functional image forming device.

On condition that the first test page coverage and second test page coverage are determined at step 710 to be different, method 700 may continue to step 714. At step 714, method 700 may assign the image forming device an abnormal operating status, as the difference in colorant coverage is indicative of an image quality defect.

Finally, at step 716, maintenance action may be initiated for the image forming device having an abnormal operating status set. Maintenance action may include scheduling a service technician visit and notifying the contacted technician of the expected problem. The data used to diagnose the problem may be included in the notification.

Figure 8:
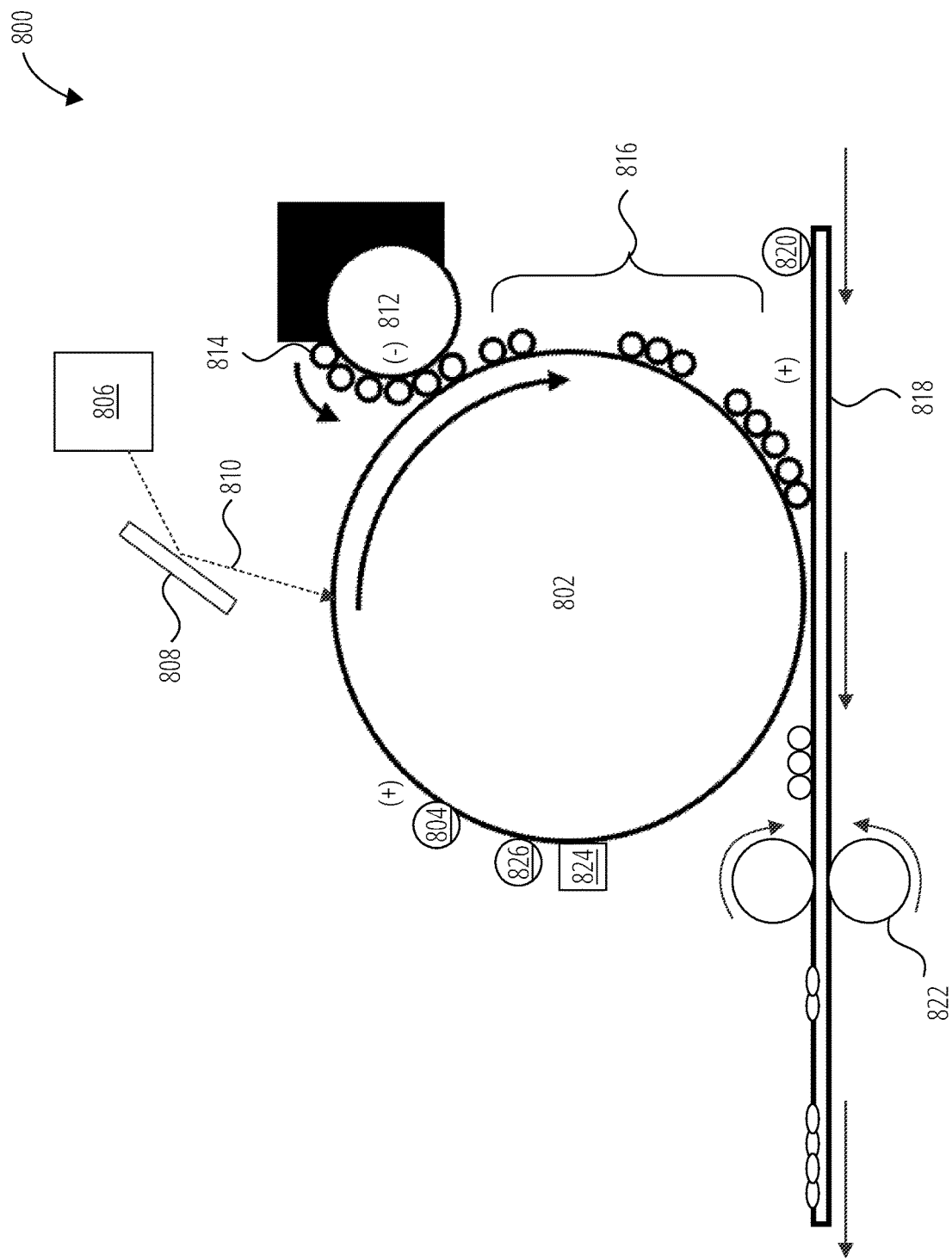
FIG. 8 illustrates a colorant deposition via electrographic printing 800 in accordance with one embodiment.

FIG. 8 illustrates colorant deposition via electrographic printing 800 in accordance with one embodiment. Colorant deposition via electrographic printing 800 may comprise a photo-sensitive drum 802, a corona wire 804, a laser scanning unit 806, a movable mirror 808, a laser beam 810, a development unit with toner 812, a toner particles 814, a latent image 816, a printable surface 818, a corona wire 820, a fuser 822, a residual toner cleaner 824, and a residual charge remover 826.

In electrographic printing, a photo-sensitive drum 802 may receive a positive charge from a corona wire 804. As the photo-sensitive drum 802 rotates, a laser scanning unit 806 may target a movable mirror 808 with a laser beam 810. The movable mirror 808 may adjust so as to direct the laser beam 810 across the surface of the photo-sensitive drum 802. Exposure to the light from the laser beam 810 may neutralize the charge on exposed portions of the drum. The laser beam 810 may be turned on and off by digital data from a computer as it is reflected upon the drum surface by the movable mirror 808. The laser may be turned on as it contacts portions of the drum surface corresponding to white areas of the printed document, removing the positive charge from these areas. The black areas of the printed document may correspond to portions of the drum not exposed by the laser. These areas of the drum surface may maintain a positive charge.

As the positive portions of the photo-sensitive drum 802 rotate past a development unit with toner 812, the positive areas of the drum may pick up negatively charged toner particles 814. The toner particles 814 may not adhere to the neutral drum areas. In this manner, a latent image 816 may be formed on the surface of the photo-sensitive drum 802 due to the electrostatic attractive bond between positive drum surface areas and negatively charged toner particles 814.

A printable surface 818 may be moved into contact with the photo-sensitive drum 802. The printable surface 818 may first pass along another corona wire 820, which may impart a positive charge to the printable surface 818. This charge may be stronger than the charge imparted to the photo-sensitive drum 802 by the corona wire 804, such that the printable surface 818 may exert a stronger attractive force upon the toner particles 814 than the photo-sensitive drum 802. As the printable surface 818 passes beneath the photo-sensitive drum 802, the latent image 816 may thus be transferred from the photo-sensitive drum 802 to the printable surface 818.

At this point, the toner particles 814 may only be resting on the printable surface 818, and may easily smear. The printable surface 818 may therefore pass through a fuser 822. At the fuser 822, toner particles 814 may be heated and pressed into the paper such that the image is securely fixed onto the printable surface 818.

For the photo-sensitive drum 802 to be reused to generate another image, it may next be cleaned of residual toner and charge. The residual toner particles 814 may be scraped off mechanically by a residual toner cleaner 824. The photo-sensitive drum 802 may rotate past a residual charge remover 826 that comprises a light, which may neutralize remaining charge. The photo-sensitive drum 802 is now ready to be charged again by the corona wire 804 to continue the printing process.

In some embodiments, a belt or other rotating device may be used in place of a drum. In some embodiments, the laser beam 810 may impart a negative charge to a rotating surface, which may then pick up positively charged toner particles 814, to be deposited on a negatively charged printable surface 818. The principles described above may be implemented in a number of ways to achieve image generation.

Figure 9:
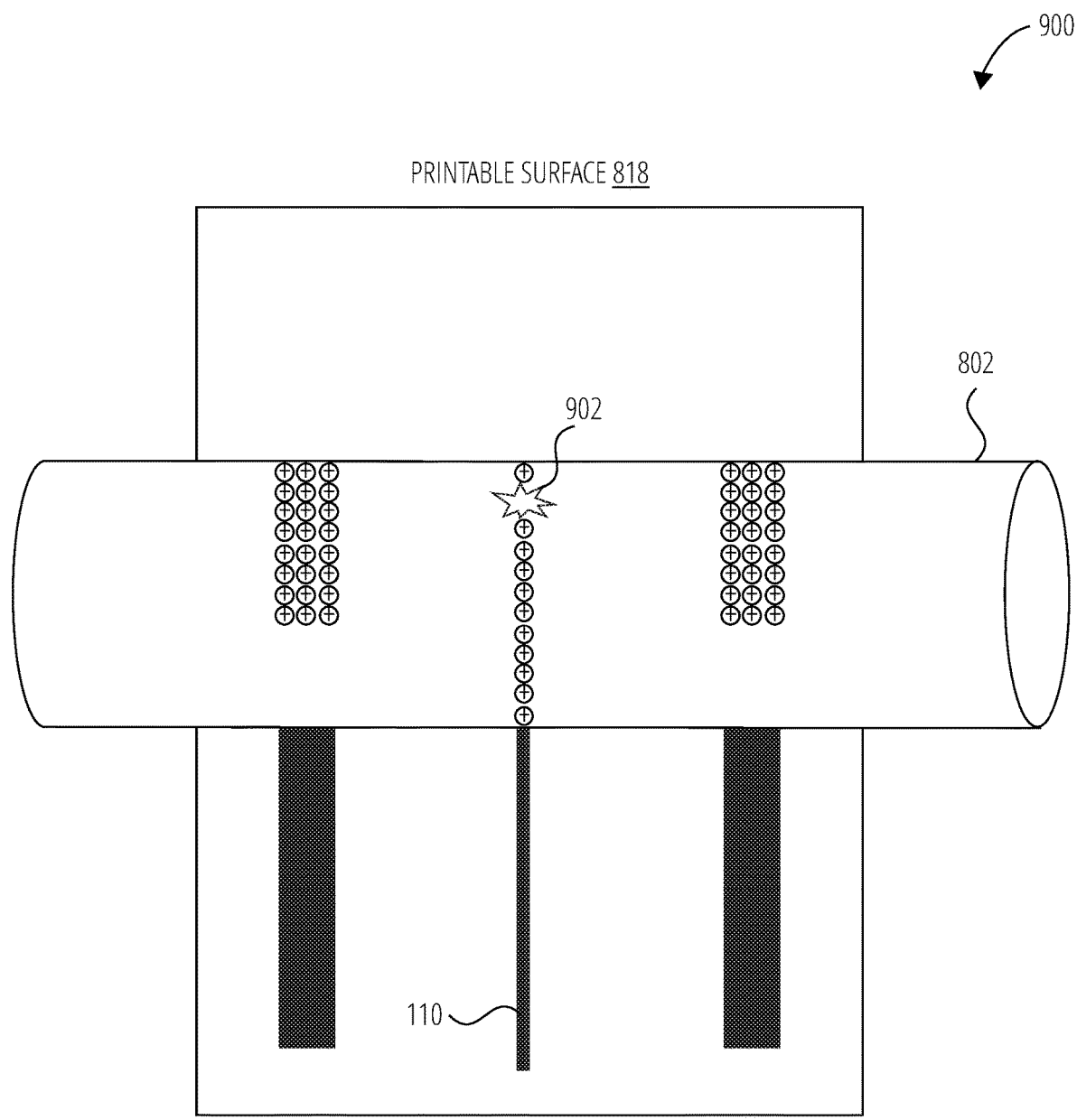
FIG. 9 illustrates a colorant deposition with debris or defect 900 in accordance with one embodiment.

FIG. 9 illustrates colorant deposition with debris or defect 900 in accordance with one embodiment. Due to the nature of electrographic printing, as described with regard to FIG. 8, a flaw or debris 902 on a photo-sensitive drum 802 may cause an extraneous amount of colorant to be picked up by the drum as it passes the colorant reservoir. Because the deposition of colorant may depend on the surface of the photo-sensitive drum 802 being altered as it rotates past a number of mechanisms, some types of flaw or debris 902 may prevent one or more of the mechanisms from effecting the necessary alteration.

For example, the corona wire that charges the drum may be prevented from imparting charge to a circumferential portion of the drum. This strip of the drum may retain a residual opposite charge, and may thus attract toner particles even when not charged by the laser. Alternately, some aspect of the drum may prevent the laser from neutralizing the desired portion of the drum. Further, a flaw may prevent residual toner from being removed or residual charge from being neutralized. As a result of this type of defect, that strip of drum may attract toner particles regardless of the intended image pattern. When these particles are transferred and fused to the printable surface 818, an unexpected vertical line 110 may result.

Other types of printers, such as inkjet printers, may operate using different fundamental technologies. However, they may also incur an unexpected line as a result of a particular defect or malfunction, and they may also directly or indirectly sense colorant consumption. The method, apparatus, and system disclosed herein is not intended to be limited to use of the technology described above, but may also be useful in diagnosing image quality defects generated using other print technologies.

Figure 10:
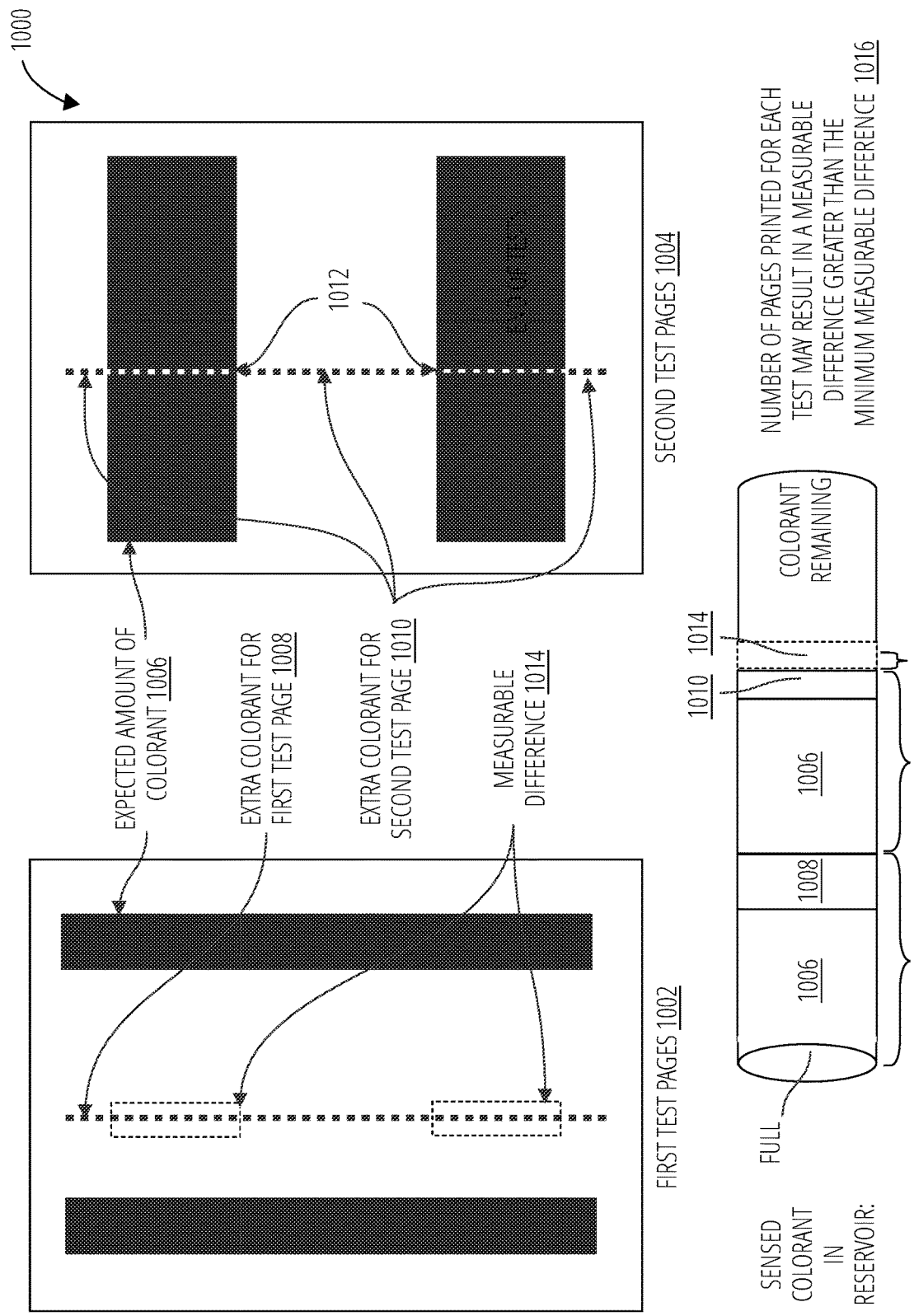
FIG. 10 illustrates a sensed colorant coverage 1000 in accordance with one embodiment.

FIG. 10 illustrates sensed colorant coverage 1000 in accordance with one embodiment. The unexpected vertical line defect described above may be seen on exemplary first test pages 1002 and second test pages 1004. When a set of first test pages 1002 and second test pages 1004 are printed, an expected amount of colorant 1006 may be deposited. This amount may, as previously described, be the same for both test page sets, provided the same number of pages are printed in each set.

A continuous dotted line represents the extra colorant for first test page 1008 that may be anticipated in the case of an unexpected vertical line defect. In contrast, the extra colorant for second test page 1010 may be seen as three portions of a dotted black line, interrupted by the area of unexpected vertical line covered by horizontal graphic pattern 1012, which is described in more detail with regard to FIG. 5. The geographic location of these interruptions in the unexpected vertical line defect are represented on the first test pages 1002 as the measurable difference 1014 incurred between the two pages. These two portions of the unexpected vertical line may result in a different amount of colorant deposited between the two test page sets.

A number of printers or other image forming devices provide sensors that measure the amount of colorant available to the device to form future images. Sensors of this type may measure weight, mass, volume, or some other parameter that may directly indicate or imply the amount of colorant available. The sensitivity of these sensors may determine a minimum measurable difference 1016, or a smallest increment by which an amount of residual colorant may be measured.

Should one copy each of the first and second test pages be printed, the difference between the toner consumed between the two jobs may be so small as to be unmeasurable. Thus a minimum number of copies of each test page may need to be printed before a difference may be detected. In the illustrated embodiment, a sample colorant reservoir is shown. Before any test pages are printed, the reservoir may measure as full. Printing a set of first test pages 1002 may result in a change in the colorant level that may be accounted for by the expected amount of colorant 1006 and the extra colorant for first test page 1008.

After printing the second test pages 1004, the change in colorant remaining in the reservoir may comprise the same expected amount of colorant 1006, because of the design of the test pages, as well as the extra colorant for second test page 1010. By nature of the horizontal graphic pattern, extra colorant for second test page 1010 may be less than the extra colorant for first test page 1008 by a measurable difference 1014. With enough test pages printed, this measurable difference 1014 may exceed the minimum measurable difference 1016, allowing the image quality defect to be diagnosed as disclosed herein.

Figure 11:
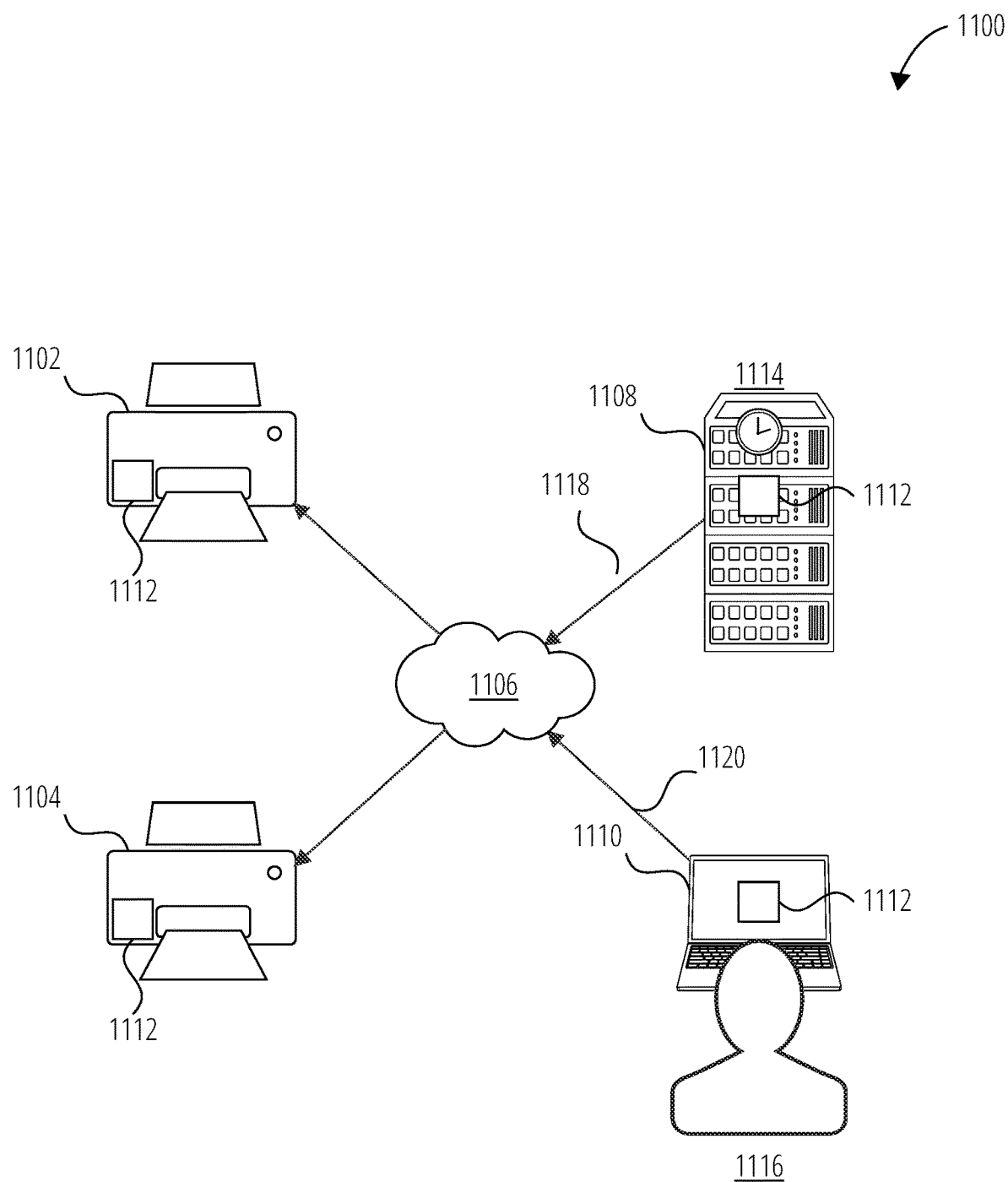
FIG. 11 illustrates an image forming system 1100 in accordance with one embodiment.

FIG. 11 illustrates an image forming system 1100 in accordance with one embodiment. The image forming system 1100 may comprise at least one image forming device 1102 that may be a multifunctional printer (i.e., at least one of the following functions: printing, scanning, facsimile, copying, etc.) or a printer 1104. The image forming system 1100 may further comprise a network 1106 and a server 1108 connected to the image forming device 1102 and/or printer 1104 via the network 1106. Alternately or additionally, a user computer 1110 may be connected to the image forming device 1102 and/or printer 1104 via the network 1106.

In various embodiments, the image forming device 1102, printer 1104, server 1108, and user computer 1110 may comprise a processor and a memory. Each may operate using architecture similar to that illustrated in FIG. 12. The memory in each device may contain instructions 1112 that allow the device to execute the method disclosed herein.

For example, in some embodiments the server 1108 may comprise task scheduling 1114 functionality that allows it to generate a command initiating instruction execution at desired time interval 1118. The instructions may be fully stored executed by the image forming device 1102 or printer 1104, stored primarily on the server 1108 itself, or partially stored in both locations, such that the periodic transmission of the command over the network 1106 results in the printer 1104 or image forming device 1102 executing the instructions to print sets of test pages. In some embodiments, the server 1108 may be an image forming server that receives print jobs, processes them if necessary, selects an appropriate printer from a plurality of printers accessible by the server, and sends the print job to the selected printer(s). In other embodiments, the server 1108 may be part of a different system, such as a monitoring server, maintenance server, etc., but is not limited thereto.

As a result of the command initiating instruction execution at desired time interval 1118 and the printed test pages, the image forming system 1100 may detect a discrepancy in colorant use indicative of an image quality defect. As a result, the image forming system 1100 may assign an abnormal operating status to the indicated device and schedule a maintenance request, as illustrated in FIG. 7.

In some embodiments, a remote user 1116 may gain access to the image forming device 1102 and printer 1104 by means of a user computer 1110 connected to the network 1106. In this manner, the remote user 1116 may send a manual, real-time command initiating instruction execution 1120 on one or both devices. The results of the subsequent tests may be visible to the remote user 1116 as diagnostic parameters such as sensed toner level, allowing the remote user 1116 to diagnose an unexpected vertical line defect without physically visiting the image forming device 1102 or printer 1104.

Figure 12:
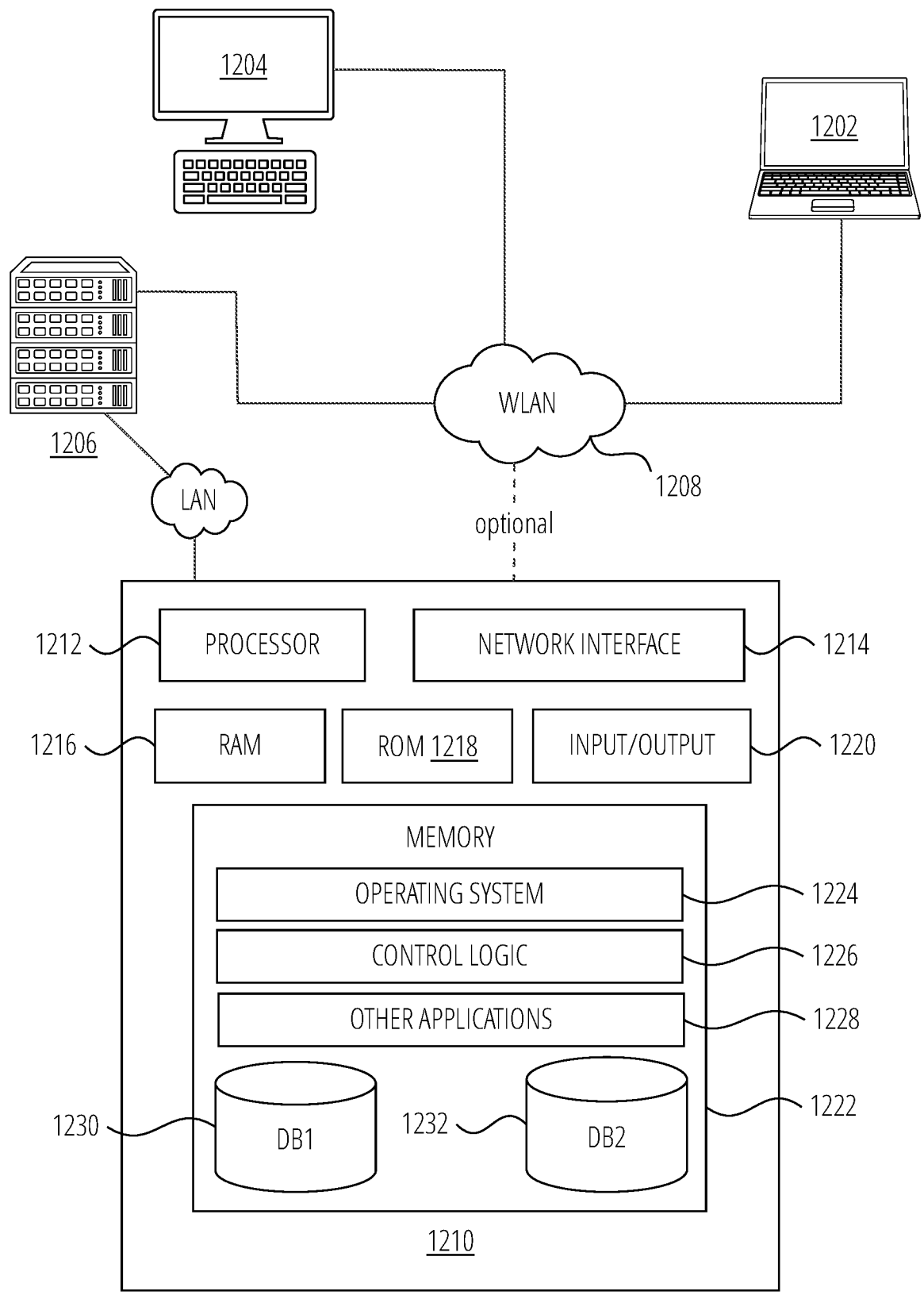
FIG. 12 depicts an illustrative computer system architecture that may be used in accordance with one or more illustrative aspects described herein.

FIG. 12 illustrates one example of a system architecture and data processing device that may be used to implement one or more illustrative aspects described herein in a stand-alone and/or networked environment. Various network nodes including data server 1210, web server 1206, computer 1204, and laptop 1202 may be interconnected via a wide area network 1208 (WAN), such as the internet. Other networks may also or alternatively be used, including private intranets, corporate networks, LANs, metropolitan area networks (MANs) wireless networks, personal networks (PANs), and the like. Network 1208 is for illustration purposes and may be replaced with fewer or additional computer networks. A local area network (LAN) may have one or more of any known LAN topology and may use one or more of a variety of different protocols, such as ethernet. Devices including data server 1210, web server 1206, computer 1204, laptop 1202 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1210, web server 1206, and client computer 1204, laptop 1202. Data server 1210 provides overall access, control and administration of databases and control software for performing one or more illustrative aspects described herein. Data server 1210 may be connected to web server 1206 through which users interact with and obtain data as requested. Alternatively, data server 1210 may act as a web server itself and be directly connected to the internet. Data server 1210 may be connected to web server 1206 through the network 1208 (e.g., the internet), via direct or indirect connection, or via some other network. Users may interact with the data server 1210 using remote computer 1204, laptop 1202, e.g., using a web browser to connect to the data server 1210 via one or more externally exposed web sites hosted by web server 1206. Client computer 1204, laptop 1202 may be used in concert with data server 1210 to access data stored therein, or may be used for other purposes. For example, from client computer 1204, a user may access web server 1206 using an internet browser, as is known in the art, or by executing a software application that communicates with web server 1206 and/or data server 1210 over a computer network (such as the internet).

Servers and applications may be combined on the same physical machines, and retain separate virtual or logical addresses, or may reside on separate physical machines. FIG. 12 illustrates just one example of a network architecture that may be used, and those of skill in the art will appreciate that the specific network architecture and data processing devices used may vary, and are secondary to the functionality that they provide, as further described herein. For example, services provided by web server 1206 and data server 1210 may be combined on a single server.

Each component including data server 1210, web server 1206, computer 1204, laptop 1202 may be any type of known computer, server, or data processing device. Data server 1210, e.g., may include a processor 1212 controlling overall operation of the data server 1210. Data server 1210 may further include RAM 1216, ROM 1218, network interface 1214, input/output interfaces 1220 (e.g., keyboard, mouse, display, printer, etc.), and memory 1222. Input/output interfaces 1220 may include a variety of interface units and drives for reading, writing, displaying, and/or printing data or files. Memory 1222 may further store operating system software 1224 for controlling overall operation of the data server 1210, control logic 1226 for instructing data server to perform aspects described herein, and other application software 1228 providing secondary, support, and/or other functionality which may or may not be used in conjunction with aspects described herein. The control logic may also be referred to herein as the data server software control logic 1226. Functionality of the data server software may refer to operations or decisions made automatically based on rules coded into the control logic, made manually by a user providing input into the system, and/or a combination of automatic processing based on user input (e.g., queries, data updates, etc.).

Memory 1222 may also store data used in performance of one or more aspects described herein, including a first database 1232 and a second database 1230. In some embodiments, the first database may include the second database (e.g., as a separate table, report, etc.). That is, the information can be stored in a single database, or separated into different logical, virtual, or physical databases, depending on system design. Web server 1206, computer 1204, laptop 1202 may have similar or different architecture as described with respect to data server 1210. Those of skill in the art will appreciate that the functionality of data server 1210 (or web server 1206, computer 1204, laptop 1202) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method of determining an image quality of an image forming device, the method comprising:
   printing a first graphic pattern on $N \geq 1$ first test pages;
   printing a second graphic pattern on N second test pages, the second graphic pattern having a same colorant coverage as the first graphic pattern;
   wherein the first graphic pattern has a different orientation and a different location on the first test page than the second graphic pattern on the second test page;

comparing colorant coverage between a total number of the first test pages and a total number of the second test pages;
determining if the colorant coverage is different on the total number of the first test pages from the colorant coverage and the total number of the second test pages; and
on condition that the colorant coverage is not the same on the total number of the first test pages and the total number of the second test pages, assigning the image forming device an abnormal operating status.

2. The method of claim 1, wherein N>1.

3. The method of claim 1 wherein a location of the second graphic pattern on the second test page at least partially overlaps a corresponding location of the first graphic pattern on the first test page.

4. The method of claim 1 further comprising:
initiating a maintenance action for the image forming device based on the abnormal operating status.

5. The method of claim 1 further comprising:
on condition that the colorant coverage is the same on the total number of the first test pages and the total number of the second test pages, assigning the image forming device a normal operating status.

6. The method of claim 1, further comprising:
determining if a difference between the colorant coverage of the total number of first test pages and the colorant coverage of the total number of second test pages is below a threshold value, wherein the threshold value is a minimum measurable difference between the colorant coverage of the total number of the first test pages and the colorant coverage of the total number of the second test pages;
on condition that the difference between the colorant coverage is below the threshold value:
printing additional sets of the first test pages and the second test pages until the difference between the colorant coverage can be measured.

7. The method of claim 1, wherein the first graphic pattern comprises a vertical graphic pattern and the second graphic pattern comprises a horizontal graphic pattern.

8. The method of claim 1, wherein the image forming device is a laser printer or an inkjet printer.

9. The method of claim 1, wherein the abnormal operating status of the image forming device includes a presence of an unexpected vertical line.

10. The method of claim 9, wherein the first graphic pattern comprises a vertical graphic pattern, the second graphic pattern comprises a horizontal graphic pattern, and the unexpected vertical line is partially covered by the horizontal graphic pattern.

11. An image forming device, comprising:
a processor; and
a memory storing instructions that, when executed by the processor, configure the image forming device to:
print a first graphic pattern on N≥1 first test pages;
print a second graphic pattern on N second test pages, the second graphic pattern having a same colorant coverage as the first graphic pattern;
wherein the first graphic pattern has a different orientation and a different location on the first test page than the second graphic pattern on the second test page;
compare colorant coverage between a total number of the first test pages and a total number of the second test pages;
determine if the colorant coverage is different on the total number of the first test pages from the colorant coverage and the total number of the second test pages; and
on condition that the colorant coverage is not the same on the total number of the first test pages and the total number of the second test pages, assign the image forming device an abnormal operating status.

12. The image forming device of claim 11, wherein a location of the second graphic pattern on the second test page at least partially overlaps a corresponding location of the first graphic pattern on the first test page.

13. The image forming device of claim 11, wherein the instructions further configure the image forming device to:
initiate a maintenance action for the image forming device based on the abnormal operating status.

14. The image forming device of claim 11, wherein the instructions further configure the image forming device to:
on condition that the colorant coverage is the same on the total number of the first test pages and the total number of the second test pages, assigning the image forming device a normal operating status.

15. The image forming device of claim 11, wherein the instructions further configure the image forming device to:
determine if a difference between the colorant coverage of the total number of first test pages and the colorant coverage of the total number of second test pages is below a threshold value, wherein the threshold value is a minimum measurable difference between the colorant coverage of the total number of the first test pages and the colorant coverage of the total number of the second test pages;
on condition that the difference between the colorant coverage is below the threshold value:
print additional sets of the first test pages and the second test pages until the difference between the colorant coverage can be measured.

16. The image forming device of claim 11, wherein the abnormal operating status of the image forming device includes a presence of an unexpected vertical line.

17. An image forming system, comprising:
at least one image forming device;
a network; and
a server connected to the at least one image forming device via the network, the server comprising:
a processor; and
a memory storing instructions that, when executed by the processor, configure the at least one image forming device or the server to:
print a first graphic pattern on N≥1 first test pages;
print a second graphic pattern on N second test pages, the second graphic pattern having a same colorant coverage as the first graphic pattern;
wherein the first graphic pattern has a different orientation and a different location on the first test page than the second graphic pattern on the second test page, and a location of the second graphic pattern on the second test page at least partially overlaps a corresponding location of the first graphic pattern on the first test page;
compare colorant coverage between a total number of the first test pages and a total number of the second test pages;
determine if the colorant coverage is different on the total number of the first test pages from the colorant coverage and the total number of the second test pages; and on condition that the colorant coverage is not the same on the total number of the first test pages and the total number of the second test pages, assign the image forming device an abnormal operating status.

18. The image forming system of claim 17, wherein the instructions further configure the image forming device or the server to:

initiate a maintenance action for the image forming device based on the abnormal operating status.

19. The image forming system of claim 17, wherein a remote user initiates the execution of the instructions by the processor.

20. The image forming system of claim 17, wherein the processor executes the instructions at a plurality of time intervals.

\* \* \* \* \*